(12) United States Patent
Erb

(10) Patent No.: US 8,155,841 B2
(45) Date of Patent: Apr. 10, 2012

(54) ARRANGEMENT FOR DETECTING A CRASH

(75) Inventor: Yannick Erb, Timis (RO)

(73) Assignee: Autoliv Development AB, Vargarda (SE)

( * ) Notice: Subject to any disclaimer, the term of this patent is extended or adjusted under 35 U.S.C. 154(b) by 694 days.

(21) Appl. No.: 12/096,276

(22) PCT Filed: Nov. 28, 2006

(86) PCT No.: PCT/SE2006/001339
§ 371 (c)(1),
(2), (4) Date: Aug. 27, 2008

(87) PCT Pub. No.: WO2007/067120
PCT Pub. Date: Jun. 14, 2007

(65) Prior Publication Data
US 2009/0037056 A1 Feb. 5, 2009

(30) Foreign Application Priority Data
Dec. 6, 2005 (GB) .................................. 0524887.7

(51) Int. Cl.
B60R 21/01 (2006.01)
(52) U.S. Cl. ........................ 701/45; 180/282; 280/735
(58) Field of Classification Search .................. 280/735; 180/282; 701/45–47
See application file for complete search history.

(56) References Cited

U.S. PATENT DOCUMENTS

| 5,430,649 | A | 7/1995 | Cashler et al. |
| 5,835,007 | A | 11/1998 | Kosiak |
| 5,964,817 | A | 10/1999 | Dalum et al. |
| 6,154,698 | A * | 11/2000 | Walden et al. ................ 701/45 |
| 6,243,633 | B1 * | 6/2001 | Kanameda et al. ............ 701/45 |
| 6,453,225 | B1 * | 9/2002 | Roelleke ...................... 701/45 |
| 6,480,772 | B1 | 11/2002 | Ugusa et al. |

FOREIGN PATENT DOCUMENTS

| WO | WO 02/14113 A1 | 2/2002 |
| WO | WO 02/053419 A1 | 7/2002 |

* cited by examiner

Primary Examiner — Ruth Ilan
(74) Attorney, Agent, or Firm — Brinks Hofer Gilson & Lione

(57) ABSTRACT

A crash detection arrangement, to be installed in a motor vehicle, for detecting a crash and providing a control signal for controlling a safety device in the event that a crash is detected, the arrangement comprising an accelerometer and a control unit, the accelerometer being arranged to supply a signal to the control unit which is indicative of the acceleration of the vehicle, the control unit being adapted to: calculate a classification parameter based on the value of the signal from the accelerometer during a classification time period, which includes an interval of time before an initiation criterion was fulfilled; modify a crash evaluation algorithm in dependence upon the classification parameter; and perform the crash evaluation algorithm upon fulfillment of the initiation criterion to produce the control signal.

22 Claims, 3 Drawing Sheets

ARRANGEMENT FOR DETECTING A CRASH

CROSS REFERENCE TO RELATED APPLICATIONS

This application claims priority to GB 0524887.7, filed Dec. 6, 2005 and PCT/SE2006/001339, filed Nov. 28, 2006.

FIELD OF THE INVENTION

The present invention relates to an arrangement for detecting a crash, and more particularly relates to an arrangement, to be installed in a motor vehicle, for detecting a crash and evaluating the severity of the crash, and for providing a signal to actuate a safety device to protect an occupant of the vehicle in the event that a crash situation occurs.

BACKGROUND OF THE INVENTION

Conventional crash detection arrangements typically comprise a crash sensor and a control unit. The crash sensor is usually an accelerometer which is connected to a processor within the control unit to provide a signal to the processor which is indicative of the acceleration applied to the vehicle, for instance by forces arising during a crash situation. The control unit is usually provided with a first comparator which compares the signal from the accelerometer with a predetermined acceleration value, which is set at a level such that values of acceleration higher than the predetermined value would indicate that the vehicle is involved in a crash situation. The processor is configured to process the signal from the accelerometer when the first comparator indicates that the signal from the accelerometer is in excess of the predetermined acceleration value. The processor processes the signal for a predetermined length of time (as explained in more detail below) following a determination that the acceleration has first risen above the predetermined acceleration value, and this processing generally determines an amount by which the velocity of the vehicle changes during the predetermined length of time.

A second comparator compares the result of the processing of the signal with a predetermined threshold. If the second comparator finds the result of the signal processing to be in excess of the predetermined threshold (i.e. the velocity has changed by more than a pre-set amount), the second comparator generates a trigger signal which is indicative of the occurrence of a crash situation which is severe enough to warrant activation of a safety device, such as an air-bag. The trigger signal is then transmitted to a safety device to actuate the safety device to protect an occupant of the vehicle.

Referring now to FIG. 1 of the accompanying drawings, the variation in the acceleration a of a vehicle is plotted against time during a crash, with a first curve $a_1$ which corresponds to a high speed crash (e.g., a crash at 37 mph) and a second curve $a_2$ which corresponds to a relatively low speed crash (e.g., a crash at 9 mph).

If a conventional crash detection arrangement, such as the arrangement described above, is installed in a vehicle which is involved in either the high speed crash or the low speed crash, the processor will begin to process the acceleration signal $a_1$ or $a_2$ when first comparator indicates that the acceleration signal $a_1$ or $a_2$ is in excess of a predetermined acceleration value $a_0$. The times at which the processor starts to process the acceleration signal $a_1$ or $a_2$, are indicated respectively at times $t_{01}$ and $t_{02}$ on FIG. 1.

The processor processes the signal $a_1$ or $a_2$ by integrating the signal $a_1$ or $a_2$ over a set length of time to determine the change in velocity $\Delta v$ of the vehicle, according to the following equation:

$$\Delta v = (\int (a - a_0) dt)$$

The resultant value indicative of the change in velocity $\Delta v$ is then compared, by the second comparator, with a predetermined threshold $\Delta v_T$.

If the second comparator detects the change in velocity $\Delta v$ to be in excess of the predetermined threshold $\Delta v_T$, (i.e. $\Delta v > \Delta v_T$) the second comparator generates a trigger signal which is transmitted to the safety device to actuate the safety device to protect an occupant of the vehicle.

Referring now to FIG. 2, the change in velocity $\Delta v$ is plotted against time, with a first curve $\Delta v_1$ corresponding to the integral of the first curve $a_1$ of FIG. 1, (i.e. the high speed crash) and a second curve $\Delta v_2$ corresponding to the integral of the second curve $a_2$ of FIG. 1 (i.e. the low speed crash). It can be seen, from FIG. 2, that the curves $\Delta v_1$ and $\Delta v_2$ each start at the respective times $t_{01}$ and $t_{02}$, which each correspond to the times at which the acceleration $a_1$ or $a_2$ first exceeds the predetermined acceleration value $a_0$, and hence the time at which the processor starts processing the signal $a_1$ or $a_2$.

A determination must be made within an appropriate period of time (e.g. 30 ms) following the time at which the acceleration rises above $a_0$ as to whether the crash situation requires the actuation of a safety device. If the actuation of the safety device is not triggered within an appropriately short period of time, the benefit of the safety device may be lost and the actuation thereof may be positively harmful to a vehicle occupant.

As can be seen from FIG. 2, the changes in velocity $\Delta v_1$ and $\Delta v_2$ exceed the predetermined threshold $\Delta v_T$ for respectively the high speed crash and the low speed crash at respective trigger times $t_{T1}$ and $t_{T2}$, which correspond to approximately 30 ms after $t_{01}$ and $t_{02}$ respectively.

The actuation of the safety device is desirable in the case of the high speed crash, represented by the first curves $a_1$ and $\Delta v_1$, as the forces (proportional to $a_1$) arising from such a high speed crash will become large, at the end of the crash event meaning that it is likely that an occupant will need protection. However, it may not be desirable to trigger the safety device as a result of the low speed crash represented by the second curves $a_2$ and $\Delta v_2$, as it is unlikely that an occupant will need the protection provided by the safety device since the forces arising from the low speed crash are likely to be minimal.

Unfortunately, as can be seen from FIGS. 1 and 2, the acceleration in a 30 ms time period following the moment at which the acceleration rises above the threshold is largely dependent on the stiffness of parts of the vehicle, and is not heavily dependent upon the severity of the impact. In a severe impact, such as a high speed crash, the acceleration will continue to rise after the 30 ms interval has passed (following a short "plateau" phase) but, as discussed above, it is not desirable to wait longer than the 30 ms interval this before a decision must be taken as to whether to actuate the safety device.

In the case of a high speed crash, therefore, it is important to actuate the safety device very soon after the crash has occurred, so that the safety device may be fully deployed to protect an occupant of the vehicle from forces arising from the crash. In order to provide early actuation of the safety device, the predetermined threshold $\Delta v_T$ can be set at a relatively low level so that the time taken for the change in velocity $\Delta v$ to rise to the low predetermined threshold $\Delta v_T$ is relatively short. However, if a low value of the predetermined threshold $\Delta v_T$ is chosen, the change in velocity $\Delta v_2$ in the case of a low speed crash will also rise to the level of the predetermined threshold $\Delta v_T$ during the 30 ms processing period. Thus, selecting a low value for the predetermined threshold $\Delta v_T$ can result in the safety device being unnecessarily actuated in the event of a low speed crash.

One way to prevent the safety device from being actuated in the event of a low speed crash would be to raise the predetermined threshold $\Delta v_T$ to a level which the change in velocity $\Delta v_2$ in a low speed crash will not reach. In this case, the safety device would only be actuated by the relatively large change in velocity $\Delta v_1$, arising from a high speed crash, which reaches the higher predetermined threshold $\Delta v_T$. However, the raising of the predetermined threshold $\Delta v_T$ means that the length of time until which the change in velocity $\Delta v$ takes to reach the threshold is increased, thus increasing the length of time after which the crash occurs when the safety device is actuated.

Therefore, the need arises for a crash detection arrangement which can actuate a safety device swiftly to protect an occupant of a vehicle during a high speed crash, but which will not actuate the safety device unnecessarily in response to a relatively low speed crash.

The present invention seeks to provide an improved arrangement for determining the severity of a crash at an early stage.

According to one aspect of the present invention, there is provided a crash detection arrangement, to be installed in a motor vehicle, for detecting a crash and providing a control signal for controlling a safety device in the event that a crash is detected, the arrangement comprising an accelerometer and a control unit, the accelerometer being arranged to supply a signal to the control unit which is indicative of the acceleration of the vehicle, characterised by the control unit being adapted to: calculate a classification parameter based on the value of the signal from the accelerometer during a classification time period, which includes an interval of time before an initiation criterion was fulfilled; modify a crash evaluation algorithm in dependence upon the classification parameter; and perform the crash evaluation algorithm upon fulfillment of the initiation criterion to produce the control signal.

Advantageously, the control unit is adapted to compare the signal from the accelerometer with a predetermined acceleration value, and the initiation criterion is fulfilled when the signal from the accelerometer first exceeds the predetermined acceleration value.

Preferably, the crash evaluation algorithm comprises processing of the signal from the accelerometer for an evaluation time period which follows the time at which the initiation criterion is fulfilled.

Conveniently, the control signal comprises an actuation signal, an evaluation parameter is calculated by the crash evaluation algorithm, the step of modifying the crash evaluation algorithm comprises the steps of setting a threshold value in dependence upon the value of the classification parameter, and the crash evaluation algorithm comprises comparing the evaluation parameter with the threshold value to provide an actuation signal in dependence upon the result of the comparison.

Advantageously, the crash evaluation algorithm comprises integration of the sensed value of acceleration, and an actuation signal is provided if the result of the integration is greater than the threshold value.

Conveniently, the control unit is configured to set the threshold value to be equal to a low threshold value when the classification parameter indicates that the rise in acceleration before fulfillment of the initiation criterion is relatively fast, and to be equal to a high threshold value when the classification parameter indicates that the rise in acceleration before fulfillment of the initiation criterion is relatively slow.

Advantageously, the classification parameter is based at least partly on an integration of the sensed value of acceleration during the classification time period, or on an average of the sensed value of acceleration during the classification time period.

Preferably, the control unit is configured to set the threshold value to be equal to the high threshold value when the classification parameter is relatively high and to be equal to the low threshold value when the classification parameter is relatively low.

Alternatively, the classification parameter is based partly on an average of a derivative of the sensed value of acceleration during the classification time period.

Conveniently, the control unit is configured to set the threshold value to be equal to the high threshold value when the classification parameter is relatively low and to be equal to the low threshold value when the classification parameter is relatively high.

Advantageously, the determination as to whether the classification parameter is relatively high or relatively low is made by comparing the classification parameter with a predetermined constant.

Preferably, the threshold value is proportional to the classification parameter.

Conveniently, the classification parameter provides an indication of the rapidity of the rise in acceleration before fulfillment of the initiation criterion.

Advantageously, the control unit is configured to set the threshold value according to a formula which is dependent upon the classification parameter.

Preferably, the control signal comprises a variable output value.

Conveniently, the control unit repeatedly re-calculates the classification parameter.

Advantageously, the classification parameter is re-calculated at regular intervals.

Preferably, the classification parameter is calculated in response to the fulfillment of the initiation criterion.

Conveniently, the arrangement comprises a memory which is configured to store sensed values of acceleration.

Advantageously, the memory is configured to store, at a given moment, values of acceleration that were sensed during a predetermined length of time preceding the given moment.

Preferably, upon fulfillment of the initiation criterion, the predetermined length of time corresponds to the classification time period.

Conveniently, the classification parameter is calculated using values of acceleration stored in the memory.

Advantageously, the classification time period falls entirely before the fulfillment of the initiation criterion.

Preferably, the classification time period has a length of approximately 8 ms.

Another aspect of the present invention provides a crash detection method for detecting whether a vehicle is involved in a crash and providing a control signal for controlling of a safety device in the event that a crash is detected, the method comprising the step of: providing an accelerometer which supplies a signal which is indicative of the acceleration of the vehicle; and being characterised by the steps of calculating a classification parameter based on the value of the signal from the accelerometer during a classification time period, which includes an interval of time before an initiation criterion was fulfilled; modifying a crash evaluation algorithm in dependence upon the classification parameter; and upon fulfillment of the initiation criterion, performing the crash evaluation algorithm to produce the control signal.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
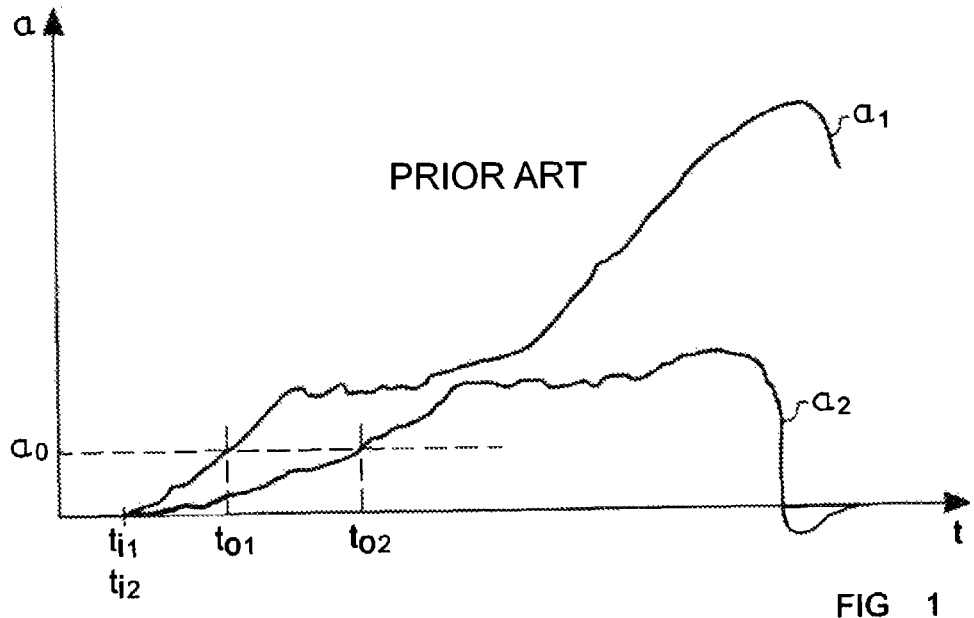
FIG. 1 is a graphical representation of the acceleration of a vehicle against time in a high speed crash and in a low speed crash.
Figure 2:
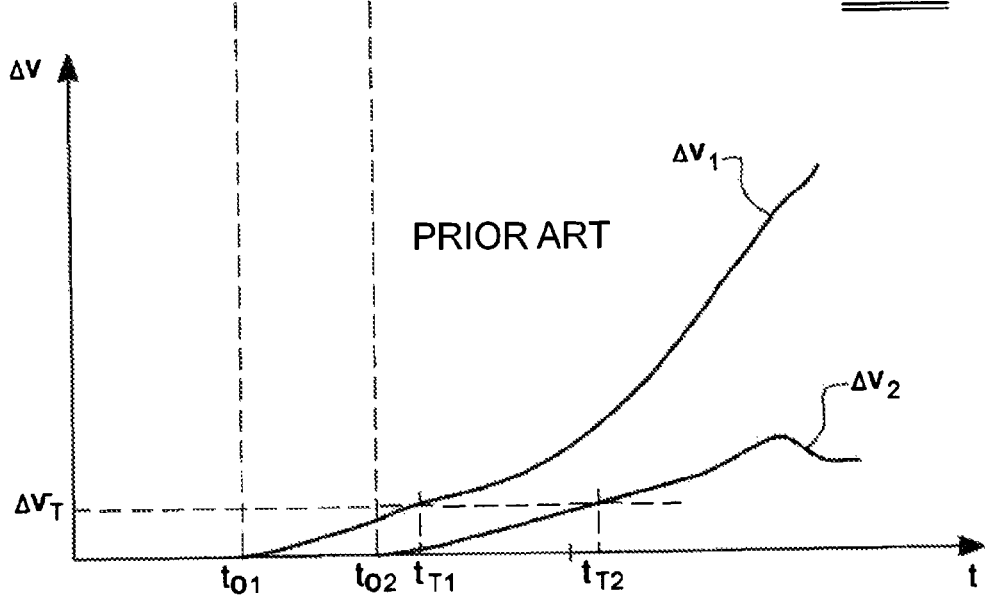
FIG. 2 is a graphical representation of the calculated change in velocity against time in a high speed crash and a low speed crash.
Figure 3:
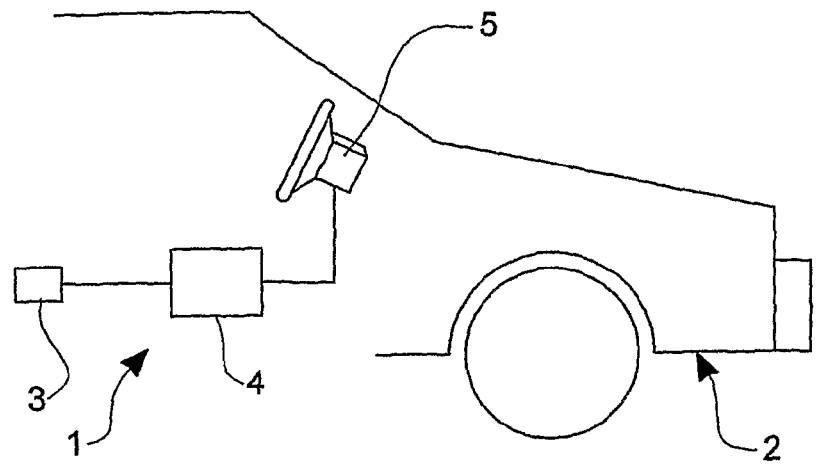
FIG. 3 is a diagrammatic view of an arrangement for detecting a crash in accordance with a preferred embodiment of the invention installed in a motor vehicle.
Figure 4:
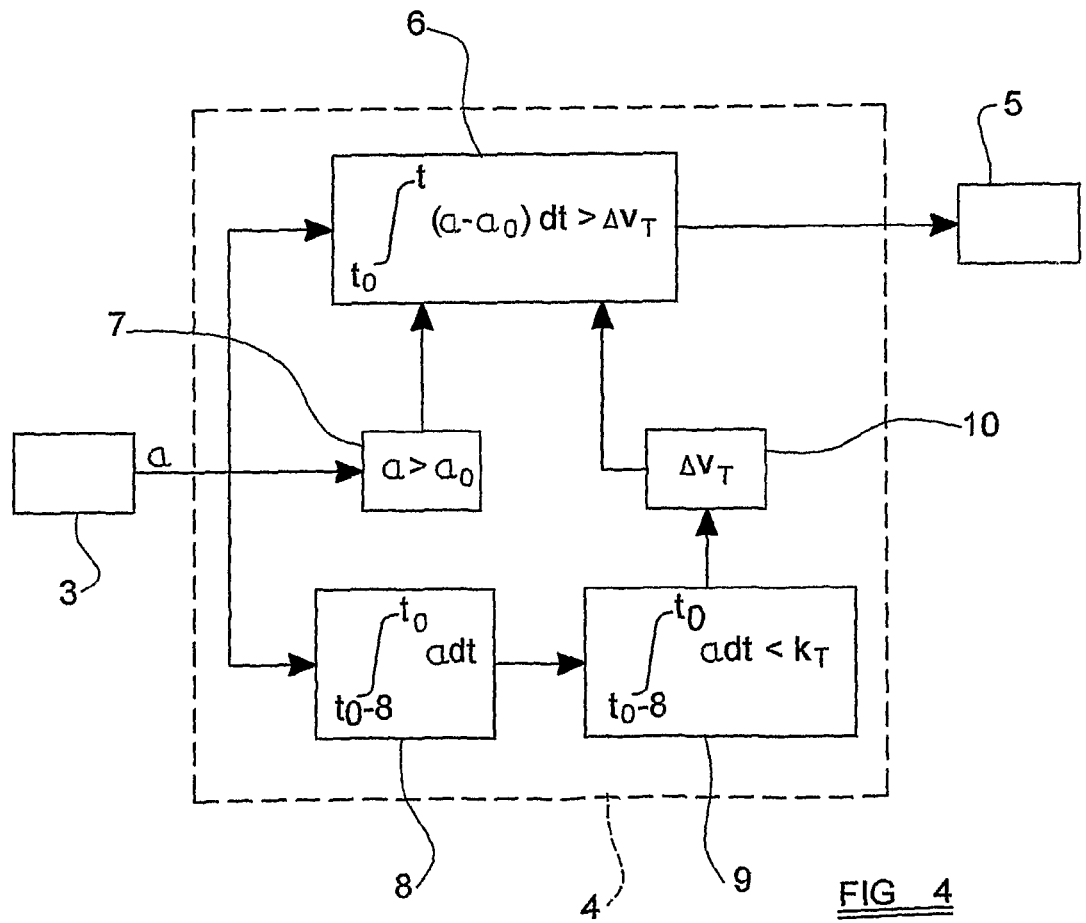
FIG. 4 is a block diagram of a control arrangement in accordance with the preferred embodiment of the invention.

Referring now to FIG. 3, a crash detection arrangement 1 embodying the present invention is installed in a motor vehicle 2 for detecting a crash situation. The arrangement 1 incorporates an accelerometer 3 which is configured to measure the acceleration of the vehicle 2. The accelerometer 3 is connected to supply a signal which is indicative of the acceleration of the vehicle 2 to a control unit 4. The control unit 4 processes the signal from the accelerometer 3 (in a manner which will be discussed below) to determine whether a crash situation is occurring. The control unit 4 is connected to a safety device 5 to provide a control to the safety device 5 in the event that a crash situation is detected, to control the operation of the safety device 5 to protect an occupant of the vehicle. The safety device 5 shown here is in the form of a front air-bag unit which may be actuated to inflate an air-bag, but it is to be appreciated that the safety device 5 may be any other type of safety device, for instance a safety belt pretensioner or a side air-bag unit.

The control unit 4 incorporates a first processing arrangement 6 which is configured to integrate the signal a from the accelerometer 3. The first processing arrangement 6 is provided with an input to receive a start signal from a comparator 7. The comparator 7 is configured to provide the start signal when the acceleration signal a first exceeds the predetermined acceleration value $a_0$. When the sensed value of acceleration rises above the acceleration value $a_0$, the processing arrangement 6 processes the acceleration signal a for an evaluation time period to determine the change in velocity $\Delta v$ of the vehicle 2 over a period of time, as discussed above. The length of the classification time period may vary in dependence upon the manner in which the result of the processing of the acceleration signal is to be used, as will be discussed below.

Thus, the first processing arrangement 6 processes the acceleration signal a for the evaluation time period to generate a value which is indicative of the change in velocity $\Delta v$ during that period of time. As discussed above, this may be achieved by integrating the sensed value of the increase in acceleration during the evaluation time period. In preferred embodiments of the invention, the first processing arrangement 6 then compares the calculated change in velocity $\Delta v$ with a predetermined threshold $\Delta v_T$. If the change in velocity $\Delta v$ is greater than the predetermined threshold $\Delta v_T$, it has been determined that the vehicle 2 is involved in a crash which is sufficiently severe to warrant activation of the safety device 5, and the first processing arrangement 6 transmits an actuation signal to the safety device 5. These embodiments are particularly applicable to use of the invention with safety devices that require an actuation signal, for instance an airbag unit. Other safety devices may require a control signal which may take several different values, or indeed be continuously variable, as will be discussed below.

In preferred embodiments of the invention, the sensed acceleration of the vehicle exceeding $a_0$ comprises an initiation criterion, which indicates that the vehicle is involved in a crash situation. Once the initiation criterion is fulfilled, the first processing arrangement 6 performs a crash evaluation algorithm to provide an evaluation parameter, and in the above-described embodiment the evaluation parameter comprises a result of integrating the sensed value of acceleration during the evaluation time period. This evaluation parameter may, as discussed above, then be compared with a threshold value to determine whether an actuation signal should be provided to the safety device 5.

The control unit 4 further incorporates a second processing arrangement 8 which is configured to process the signal a from the accelerometer 3 over a classification time period, which in preferred embodiments has a length of around 8 ms. In such embodiments, at any given moment, the classification time period corresponds at least approximately to the 8 ms preceding that moment. This calculation is continuously updated, and for instance could be updated for each new sample of acceleration that is taken. A typical interval between samples is around 0.5 ms.

In embodiments of the present invention, the second processing arrangement 8 is configured to integrate the signal a from the accelerometer 3 for consecutive and successive periods of time corresponding to the classification time period. The second processing arrangement 8 once again integrates the signal a from the accelerometer 3 over the classification time period, which in these embodiments may be at least approximately 8 ms, to determine a value k to be used as a classification parameter. The second processing arrangement 8 therefore continually calculates values of k for successive time periods even when the sensed value of acceleration a is below the predetermined acceleration value $a_0$. Thus, at any moment in time, irrespective of the acceleration of the vehicle, the second processing arrangement 8 will recently have calculated a value of k for the preceding 8 ms, and it will be appreciated that the second processing arrangement 8 thus operates on data relating to a "sliding window" of time which falls just before the present time.

After the second processing arrangement 8 has generated the value k the second processing arrangement 8 passes the value k to a second comparator 9. The second comparator 9 has an output connected to a memory unit 10 which is adapted to store a value which corresponds to the predetermined threshold $\Delta v_T$.

In embodiments of the invention in which the control signal comprises an actuation signal, the second comparator 9 compares the value k with a predetermined constant $k_T$, and if the second comparator 9 determines that the value k is less than the constant $k_T$, the second comparator 9 passes a value to the memory unit 10 which corresponds to a low predetermined threshold $\Delta v_{T1}$. The memory unit 10 stores the low predetermined threshold $\Delta v_{T1}$ until a further value is sent from the second comparator 9. If the second comparator 9 determines that the value k from the second processing arrangement 8 is greater than the constant $k_T$, the second comparator 9 passes a value to the memory unit 10 which corresponds to a high predetermined threshold value $\Delta v_{T2}$.

Alternatively, the threshold $\Delta v_T$ may be set in accordance with a formula which is dependent upon the value k, and thus may take more values than a high predetermined threshold $\Delta v_{T2}$ or a low predetermined threshold $\Delta v_{T1}$. For instance, the threshold $\Delta v_T$ may be set to be proportional to k, or include a component which is proportional to k (for instance comprising a constant to which a factor is added, the factor being proportional to k). Alternatively, the threshold $\Delta v_T$ may be proportional to the $\sqrt{k}$, to $k^2$, or be dependent in any other way upon k, as a skilled person will appreciate.

In these embodiments, the threshold $\Delta v_T$ that is set may be continuously variable, and hence may be set to be appropriate for any type of crash situation.

The memory unit 10 is also connected to the first processing arrangement 6 to provide the stored value of the predetermined threshold $\Delta v_T$ to the first processing arrangement 6. Thus, it is to be appreciated that the threshold $\Delta v_T$ is set to either a low threshold $\Delta v_{T1}$ or a high threshold $\Delta v_2$ in dependence upon the most recent value of k produced by the second processing arrangement 8.

Figure 5:
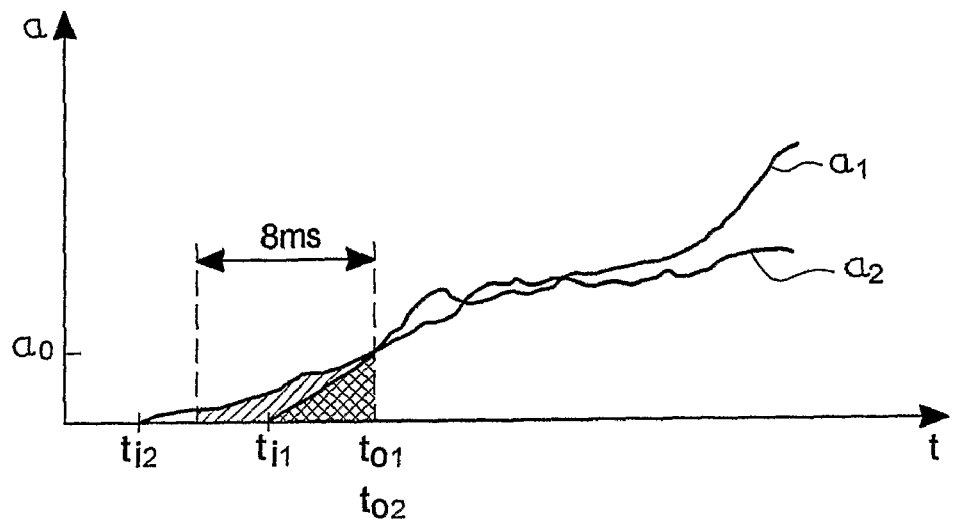
FIG. 5 is a graphical representation of the acceleration of the vehicle against time, during an initial stage after a collision, in the case of a high speed crash and a low speed crash.

Referring now to FIG. 5, the curves $a_1$ and $a_2$ representing respectively the acceleration of the vehicle in a high speed crash and a relatively low speed crash, have been plotted so that the curves $a_1$ and $a_2$ first intersect at a time $t_{01}$ or $t_{02}$ when each of the curves $a_1$ or $a_2$ first exceeds the predetermined acceleration value $a_0$ and the initiation criterion is thus fulfilled. The "sliding window" of 8 ms is indicated as being a period of 8 ms before the times $t_{01}$ and $t_{02}$ when the curves $a_1$ and $a_2$ first exceed the predetermined acceleration value $a_0$. The values of the acceleration a of the vehicle during this 8 ms "sliding window" are the values of acceleration a which are processed by the second processing arrangement 8. It is to be appreciated that as the second processing arrangement 8 carries out an integrating calculation over the classification time period to calculate the value k, the value k will correspond to the area beneath each of the curves $a_1$ and $a_2$ during the classification time period. It can be seen that, as the acceleration a of the vehicle rises more rapidly during the initial stages of a high speed crash situation represented by curve $a_1$, as opposed to a low speed crash situation represented by curve $a_2$, the area beneath the high speed crash curve $a_1$ is less than the area beneath the low speed crash curve $a_2$ over the classification time period. Thus, the value k calculated by the second processing arrangement 8 is less in the case of a high speed crash than the value k calculated during a low speed crash.

This difference in the calculated value of k relating to the classification time period preceding the rise of the acceleration a above the predetermined acceleration value $a_0$ can be used to differentiate, at an early stage, between a high speed crash and a low speed crash. The constant $k_T$ which is compared by the second comparator 9 with the value k is chosen so that when the value k is less than the constant $k_T$, indicating that the sensed acceleration value rose quickly towards the end of the classification time period and thus that a high speed crash is occurring, the second comparator 9 passes a low threshold value $\Delta v_{T1}$ to the memory unit 10. Conversely if the value k is greater than the constant $k_T$, indicating a rapidity in the rise in acceleration which is below the predetermined value, and thus a low speed crash, the second comparator passes a high predetermined threshold $\Delta v_{T2}$ to the memory unit 10.

Thus, the calculated value k is lower when it has been determined that the vehicle is involved in a high speed crash, thereby helping to ensure that a safety device is triggered effectively in this situation.

In the above description, the value k is generated by integrating the sensed acceleration over the classification time period. However, in alternative embodiments, the second processing arrangement may calculate a value for k by taking an average of values of acceleration during the classification time period. In these embodiments, a low value of k is indicative of a more severe crash.

A further alternative approach is to take an averages of the derivative of these acceleration values. In these embodiments, a shorter classification time period will generally be appropriate, and for instance a classification time period of around 4 ms may be used. This is because, over an 8 ms classification time period, the averages of the derivatives of the second acceleration for gentle and severe crashes are likely to be similar, because at the start of the 8 ms classification time period the sensed acceleration will be close to zero in both cases, and at the end of the 8 ms classification time period the sensed value of acceleration will have risen in both cases, but by a similar amount. Since the derivative of the sensed acceleration is effectively equal to the slope of the acceleration/time graph, it will be understood that the average slope over 8 ms will be similar or identical over 8 ms for severe and gentle crashes. In effect, the fact that, for a more severe crash, the sensed acceleration would have remained low for the first part of the classification time period and then risen relatively rapidly would not be detected.

If, however, a shorter classification time period, for example of 4 ms, is used, this distinction can be detected far more readily. In the case of a more gentle crash, the sensed acceleration will begin to rise before the start of the 4 ms classification time period, and will already have risen by a certain amount at the start of the 4 ms classification period and continue to rise relatively gently throughout the 4 ms classification time period.

By contrast, in the case of a more severe crash, the sensed acceleration is likely to be around zero at the start of the 4 ms classification period, and rise sharply during this period. The average of the derivative of the acceleration value will therefore be higher in the case of a more severe crash when a shorter classification time period such as this is used. In this embodiment, therefore, a high value of k is indicative of a more severe crash.

A skilled person will understand how the above-described method may be adapted to accommodate these alternative methods of generating the value of k.

Figure 6:
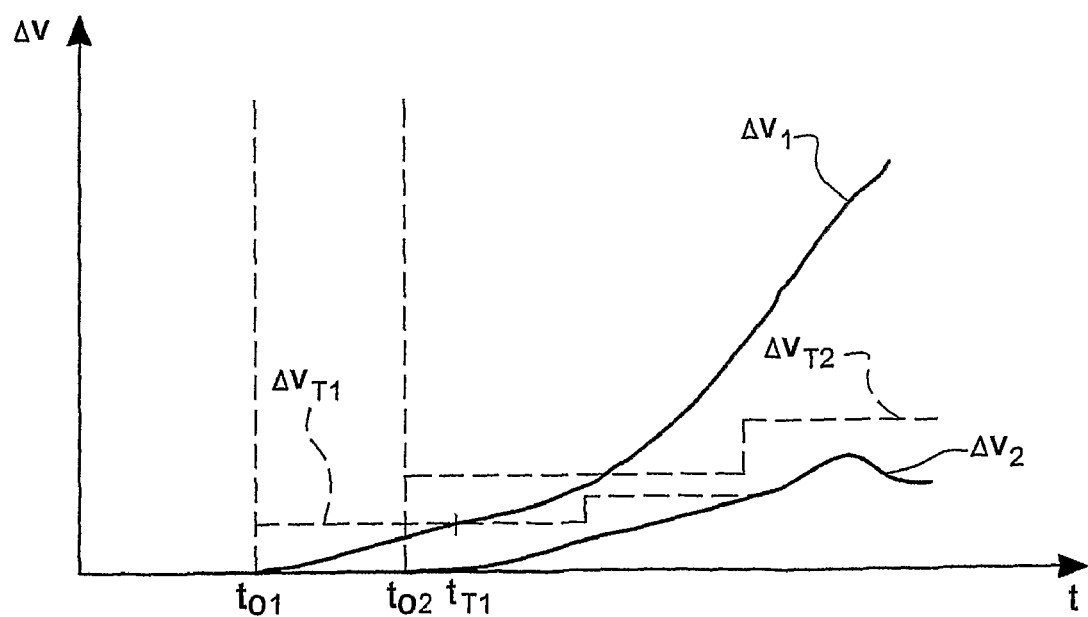
FIG. 6 is a graphical representation corresponding to FIG. 2, but including a high predetermined threshold and a low predetermined threshold.

Referring now to FIG. 6, the change in velocity $\Delta v$ can be seen against time for the case of a high speed crash and a low speed crash, indicated respectively by curves $\Delta v_1$ and $\Delta v_2$. The high and low predetermined thresholds $\Delta v_{T1}$ and $\Delta v_{T2}$ are also indicated. It is to be appreciated that a high speed crash curve $\Delta v_1$ intersects the low predetermined threshold $\Delta v_{T1}$ at a trigger time $t_{T1}$ which is relatively soon after the start time $t_{01}$. If the second comparator 9 sets the high predetermined threshold $\Delta v_{T2}$, it can be seen that the high predetermined threshold $\Delta v_{T2}$ only intersects with the high speed crash curve $\Delta v_1$ and not the low speed crash curve $\Delta v_2$. Thus, if the second processing arrangement 8 and the second comparator 9 determine that the crash is a low speed crash, with the value k being greater than the constant $k_T$, the high predetermined threshold $\Delta v_{T2}$ is selected to avoid the trigger signal being generated by the low predetermined threshold $\Delta v_{T2}$ being exceeded. However, it is to be appreciated that the high predetermined threshold $\Delta v_{T2}$ may be exceeded if a low speed crash subsequently changes in severity to become a severe or high speed crash. The arrangement 1 can thus be used to trigger the safety device 5 in the event of a low speed crash which subsequently develops into a severe or high speed crash.

Although the preferred embodiment described thus far only incorporates two predetermined threshold $\Delta v_{T1}$ and $\Delta v_{T2}$, it is to be appreciated that other embodiments may utilise a greater number of predetermined thresholds, to distinguish more finely between different types of crash.

It will be noted that both $\Delta v_{T1}$ and $\Delta v_{T2}$ are "stepped" in shape on the graph of FIG. 6, and hence vary with time. These thresholds may vary with time in order to increase the number of dangerous types of crash that are correctly detected, while correctly classifying less dangerous crashes, and a skilled person will appreciate how this may be achieved. In the example shown $\Delta v_{T1}$ and $\Delta v_{T2}$ are stepped, but part or all of either of these thresholds may vary continuously with time.

Whilst the preferred embodiment utilises a classification time period which is around 8 ms in length, it is to be understood that the classification time period may be any other length of time, which is greater or less than 8 ms (in particular, see the discussion above relating to the use of a shorter time period in certain embodiments). Also, although the second processing arrangement 8 of the preferred embodiment calculates the value k every 0.5 ms, in other embodiments the value k may be calculated after successive time intervals which are greater or less than 0.5 ms.

Indeed, the second processing arrangement 8 may calculate a value for k only when the sensed value of acceleration first rises above $a_0$. Thus, in this embodiment a sliding window of data is stored, but this data is only processed as and when it is detected that a crash situation has arisen.

In the above, it is described that the crash evaluation algorithm decides whether or not an actuation is signal is provided to a safety device, and an example of a safety device that may receive an actuation signal is an air-bag, the actuation signal simply dictates whether or not the air-bag is inflated. However, the output of the crash evaluation algorithm could also control a continuous parameter, such as the force level of a seat belt force limiter, or the pressure of air which is introduced into an air-bag. Therefore, the crash evaluation algorithm need not simply output a parameter which is compared with a threshold, but may output an appropriate and continuously variable value which may be used by the control unit 4 to control a safety-device, as will be appreciated by a skilled person. Even if a threshold is used, the triggering of the safety device could be adjusted in response to the detected crash severity by changing parameters in the crash evaluation algorithm.

Although the preferred embodiment described above utilises a control unit 4 which has two processing arrangements 6,8 and two comparators 7,9 and a memory unit 10, the invention is not limited to such an arrangement. Indeed, it is to be understood that other embodiments of the invention may have any suitable control unit which can carry out equivalent steps to the control unit 4 of the preferred embodiment, for instance with the steps being carried out by a single processor or other unit.

While the above description constitutes the preferred embodiment of the present invention, it will be appreciated that the invention is susceptible to modification, variation and change without departing from the proper scope and fair meaning of the accompanying claims.

The invention claimed is:

1. A crash detection arrangement, to be installed in a motor vehicle, for detecting a crash and providing a control signal for controlling a safety device in the event that a crash is detected, the arrangement comprising an accelerometer and a control unit, the accelerometer being arranged to supply a signal to the control unit which is indicative of the acceleration of the vehicle, the control unit is configured to:
continuously update a classification parameter based on the value of the signal from the accelerometer over a sliding time window spanning a fixed classification time period,
determine that a predetermined initiation criterion independent of the classification parameter is fulfilled;
upon determining that the initiation criterion was fulfilled, modify a threshold value of a crash evaluation algorithm in dependence upon the classification parameter, wherein the classification parameter is the classification parameter last calculated from a time window that includes an interval of time before the initiation criterion was fulfilled, and wherein the threshold value is set to be equal to a low threshold value when the classification parameter indicates that the rise in acceleration before fulfillment of the initiation criterion is relatively fast, and to be equal to a high threshold value when the classification parameter indicates that the rise in acceleration before fulfillment of the initiation criterion is relatively slow; and
determine an evaluation parameter with the crash evaluation algorithm upon fulfillment of the initiation criterion;
determine that the evaluation parameter has exceeded the threshold value; and
produce the control signal upon determining that the evaluation parameter has exceeded the threshold value.

2. An arrangement according to claim 1, wherein the control unit is configured to compare the signal from the accelerometer with a predetermined acceleration value, and the initiation criterion is fulfilled when the signal from the accelerometer first exceeds the predetermined acceleration value.

3. An arrangement according to claim 1, wherein the crash evaluation algorithm comprises processing of the signal from the accelerometer for an evaluation time period which follows the time at which the initiation criterion is fulfilled.

4. An arrangement according to claim 1, wherein:
the control signal comprises an actuation signal;
an evaluation parameter is calculated by the crash evaluation algorithm;
and
the crash evaluation algorithm comprises comparing the evaluation parameter with the threshold value to provide an actuation signal in dependence upon the result of the comparison.

5. An arrangement according to claim 4, wherein:
the crash evaluation algorithm comprises integration of the sensed value of acceleration; and
an actuation signal is provided if the result of the integration is greater than the threshold value.

6. An arrangement according to claim 4, wherein the classification parameter is based at least partly on an integration of the sensed value of acceleration during the classification time period, or on an average of the sensed value of acceleration during the classification time period.

7. An arrangement according to claim 4, wherein the classification parameter is based partly on an average of a derivative of the sensed value of acceleration during the classification time period.

8. An arrangement according to claim 7, wherein the control unit is configured to set the threshold value to be equal to the high threshold value when the classification parameter is relatively low and to be equal to the low threshold value when the classification parameter is relatively high.

9. An arrangement according to claim 1, wherein a determination as to whether the classification parameter is relatively high or relatively low is made by comparing the classification parameter with a predetermined constant.

10. An arrangement according to claim 1, wherein the classification parameter provides an indication of the rapidity of the rise in acceleration before fulfillment of the initiation criterion.

11. An arrangement according to claim 10, wherein the control unit is configured to set the threshold value according to a formula which is dependent upon the classification parameter.

12. An arrangement according to claim 1, wherein the control signal comprises a variable output value.

13. An arrangement according to claim 1, wherein the classification parameter is re-calculated at regular intervals.

14. An arrangement according to claim 1, wherein an evaluation parameter is calculated in response to the fulfillment of the initiation criterion.

15. An arrangement according to claim 1, comprising a memory which is configured to store sensed values of acceleration.

16. An arrangement according to claim 15 wherein the memory is configured to store, at a given moment, values of acceleration that were sensed during a predetermined length of time preceding the given moment.

17. An arrangement according to claim 16, wherein, upon fulfillment of the initiation criterion, the predetermined length of time corresponds to the classification time period.

18. An arrangement according to claim 15, wherein the classification parameter is calculated using values of acceleration stored in the memory.

19. An arrangement according to claim 1, wherein the classification time period falls entirely before the fulfillment of the initiation criterion.

20. An arrangement according to claim 1, wherein the classification time period has a length of approximately 8 ms.

21. A crash detection arrangement, to be installed in a motor vehicle, for detecting a crash and providing a control signal for controlling a safety device in the event that a crash is detected, the arrangement comprising an accelerometer and a control unit, the accelerometer being arranged to supply a signal to the control unit which is indicative of the acceleration of the vehicle, the control unit is configured to:

calculate a classification parameter based on the value of the signal from the accelerometer during a classification time period, which includes an interval of time before an initiation criterion was fulfilled;

modify a threshold value of a crash evaluation algorithm in dependence upon the classification parameter, wherein the threshold value is set to be equal to a low threshold value when the classification parameter indicates that the rise in acceleration before fulfillment of the initiation criterion is relatively fast, and to be equal to a high threshold value when the classification parameter indicates that the rise in acceleration before fulfillment of the initiation criterion is relatively slow;
and
determine an evaluation parameter with the crash evaluation algorithm upon fulfillment of the initiation criterion;

determine that the evaluation parameter has exceeded the threshold value; and produce the control signal upon determining that the evaluation parameter has exceeded the threshold value;

wherein the control signal comprises an actuation signal, and wherein the classification parameter is based at least partly on an integration of the sensed value of acceleration during the classification time period, or on an average of the sensed value of acceleration during the classification time period; and wherein the threshold value is proportional to the classification parameter.

22. A crash detection method for detecting whether a vehicle is involved in a crash and providing a control signal for controlling of a safety device in the event that a crash is detected, the method comprising the step of:

providing an accelerometer which supplies a signal which is indicative of the acceleration of the vehicle;

continuously updating a classification parameter based on the value of the signal from the accelerometer over a sliding time window spanning a fixed classification time period;

determining that a predetermined initiation criterion independent of the classification parameter is fulfilled;

upon determining that the initiation criterion was fulfilled, modifying a threshold value of a crash evaluation algorithm in dependence upon the classification parameter; and upon exceeding the threshold value, producing the control signal.

* * * * *